E. MOEWES.
RETARDING MECHANISM FOR MOTOR VEHICLES.
APPLICATION FILED SEPT. 30, 1913.
1,144,372.
Patented June 29, 1915.
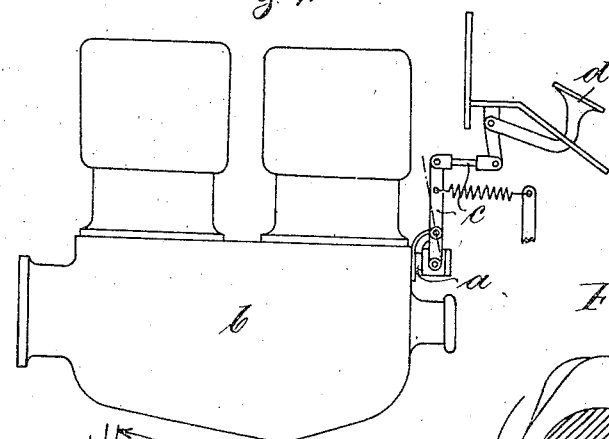
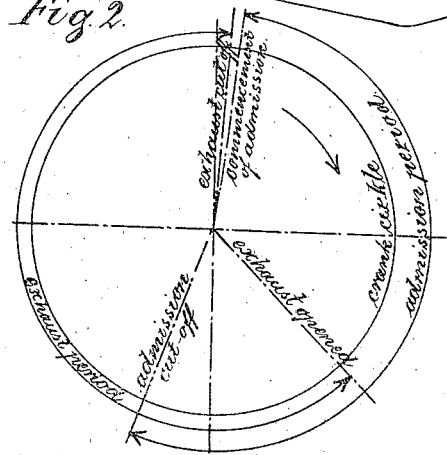
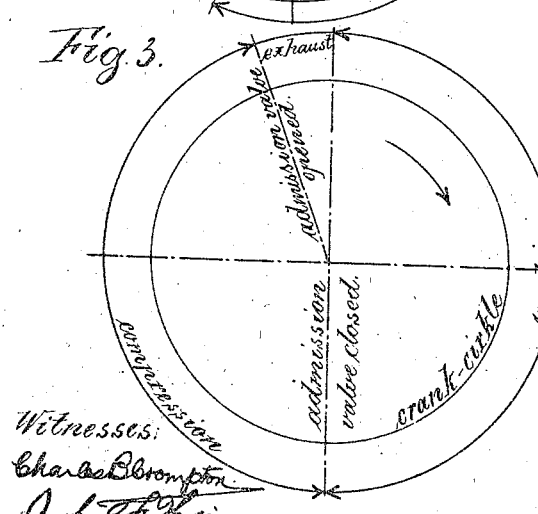
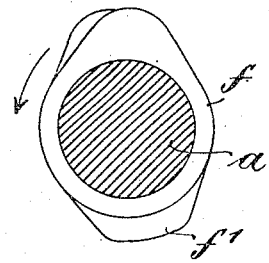
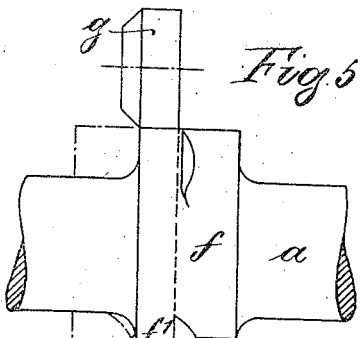
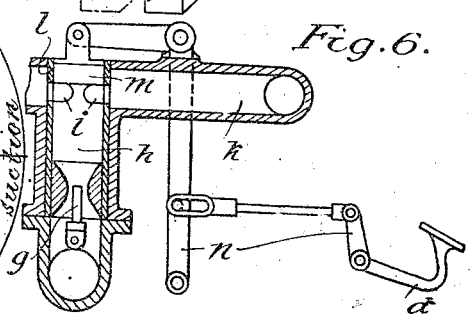
Witnesses:
Charles Brompton
John F. Heinz
Inventor
Ernst Moewes
by
Ebergdon Marks
Attorney.

UNITED STATES PATENT OFFICE.

ERNST MOEWES, OF MARIENFELDE, NEAR BERLIN, GERMANY, ASSIGNOR TO THE FIRM OF DAIMLER-MOTOREN-GESELLSCHAFT, OF UNTERTURKHEIM, GERMANY.

RETARDING MECHANISM FOR MOTOR-VEHICLES.

1,144,372.  Specification of Letters Patent.  Patented June 29, 1915.

Application filed September 30, 1913. Serial No. 792,625.

*To all whom it may concern:*

Be it known that I, ERNST MOEWES, subject of the German Emperor, residing at 7 Schulz'sche Privatstrasse, Marienfelde, near Berlin, Germany, have invented certain new and useful Improvements in Retarding Mechanism for Motor-Vehicles, of which the following is a specification.

This invention relates to mechanism for retarding or braking motor vehicles in which the braking is effected in known manner by the reaction on the piston due to the compression in the engine cylinder when the piston is driven by the motion of the vehicle.

It has already been proposed in four-stroke cycle engines to create a reaction on the piston during three fourths of the cycle by keeping the admission valve closed, thus cutting off all communication with the carbureter and creating a partial vacuum in the cylinder during the first or suction stroke of the cycle, the vacuum being destroyed at the end of the stroke by opening the exhaust valve. The exhaust valve is then reclosed whereupon compression occurs, the pressure being relieved at the end of the compression stroke by again opening the exhaust valve. On reclosing the exhaust valve, a partial vacuum is again created in the cylinder during the third stroke of the cycle and the exhaust valve is finally opened during the whole of the fourth stroke of the cycle. For this purpose the cam shaft is made axially movable and the exhaust cam is made of extra width so as to hold the exhaust valve open during the fourth stroke of the cycle when the cam shaft is axially displaced, two additional cams being provided to open and close the exhaust valve at the end of the first and second strokes of the cycle. This arrangement, however, has the drawback that, at the commencement of the braking operation, any exhaust gases remaining in the exhaust passages will be drawn into the cylinder and compressed therein, giving rise to excessive wear and overheating in the cylinder. Moreover, the creation of a partial vacuum in the cylinder leads to the danger of sooting the ignition plugs and consequent misfiring when the engine is again set in operation.

It has also been proposed to keep the admission valve constantly closed and to open the exhaust valve during a part of each outstroke and to keep the exhaust valve nearly closed during the whole inward stroke of the piston. This arrangement has also the drawback, that the exhaust gases remaining in the exhaust passages will be drawn into the cylinder.

Another proposal is: to cut off the admission of the fuel and to let work the admission valve and the exhaust valve in the usual manner. In this case pure air is drawn in through the admission valve and expelled through the exhaust valve. This arrangement has the drawback that the air compressed during the inward stroke of the piston, propels the piston during the third stroke of the cycle, so that the braking action is very little.

The object of the present invention is to avoid the foregoing disadvantages and to provide for efficient scavenging of the cylinder. For this purpose, a reaction on the piston is only created during the instroke of the piston by keeping the exhaust valve constantly closed and closing the admission valve during the instroke of the piston so that compression occurs in the cylinder, the admission valve being kept open during the outstroke of the piston so that no vacuum is created in the cylinder and misfiring on restarting the engine is thus avoided. Moreover, pure air is adapted to be drawn in and expelled through the admission valve so that efficient scavenging of the cylinder is effected. The admission valve is preferably opened shortly before the piston reaches the end of its instroke and is closed when the piston is at or near the end of its outstroke.

The valve gear is preferably operated by means of lever mechanism or the like adapted to shift the cam shaft of the valve mechanism axially to such an extent that the exhaust cam is put out of action, while the admission cam which is correspondingly broader remains in action beneath the roller on the admission valve spindle, the admission cam being correspondingly shaped to effect the opening and closing of the admission valve as above described.

Referring to the accompanying drawings which show the preferred manner of carrying out the invention, Figure 1 is a side view of an engine provided with mechanism according to the present invention for retarding the motion of the vehicle. Fig. 2 is a diagram showing the successive operations during the ordinary working period of the engine. Fig. 3 is a diagram showing the different operations when the engine is utilized to retard the motion of the vehicle. Fig. 4 is a side view of the admission cam and Fig. 5 a front view of the admission cam showing the cam moved so as to actuate the admission valve for retarding the vehicle. Fig. 6 is a section view through the carbureter.

The cam shaft $a$ of the engine $b$ is mounted in bearings so as to be axially movable and is connected by means of lever mechanism $c$ with a pedal $d$, the depression of which will shift the cam shaft axially a certain amount. By this movement the exhaust cam (not shown) will be shifted from beneath the roller on the exhaust valve spindle so that the exhaust valve will not be actuated and therefore always remains closed. At the same time the admission cam $f$ is moved from the position illustrated in dotted lines in Fig. 5 to that illustrated in full lines. By this means the lefthand half of the broad admission cam $f$ will be brought beneath the roller $g$ on the admission valve spindle which roller $g$ previously made contact with the righthand half of the cam $f$, the righthand half being of the usual shape so that on the rotation of the cam shaft $a$ the admission valve will be actuated in the manner indicated in Fig. 2.

The lefthand half of the admission cam $f$ is, however, provided with an extra projection $f'$ and is so shaped that the admission valve is opened a short time before the piston reaches its inner dead point position and is again closed on the piston reaching its outer dead point position. By controlling the admission valve in this manner, when the exhaust valve is closed, the effect indicated in Fig. 3 will be obtained. On the outstroke of the piston the latter draws in air through the opened admission valve until it reaches its outer dead point position when the admission valve is closed. During the succeeding inward stroke of the piston the air in front of the piston is compressed until the admission valve is opened a short time before the inner dead point position is reached. By compressing the air in front of the piston, the motion of the piston is retarded and retards the vehicle driving the piston. By opening the admission valve a short time before the piston reaches its inner dead point position, the pressure within the cylinder and the pressure of the outer air are equalized whereupon air is again drawn into the cylinder after the piston has passed over the dead point.

It will, of course, be manifest that the carbureter must be cut off from communication with the engine so that no gas mixture will be supplied through the admission valve and so that air may be drawn in through the admission valve. This is a well known arrangement, but by way of example, I have shown a carbureter in Fig. 6 comprising a fuel jet nozzle $g$ within a chamber $h$ opening through slots $i$ in a sleeve $l$ into a pipe $k$ which supplies the gas mixture to the engine cylinders. The sleeve $l$ contains a movable piston valve $m$ adapted to normally close the end of the sleeve and uncover the slots $i$. When the pedal $d$ of the valve mechanism is depressed, the piston valve $m$ is adapted to close the slots $i$ and open the end of the sleeve $l$ to admit air to the pipe $k$ and engine cylinders through the medium of lever connections $n$.

I claim:—

1. In combination with the engine of a motor vehicle having admission and exhaust valves, comprising means for holding the exhaust valve closed means for opening the admission valve when the piston is near the end of its instroke and during the outstroke of the piston and for closing the admission valve when the piston is near the end of its outstroke and during its instroke and means for admitting air to the engine cylinder through said admission valve.

2. In combination with the engine of a motor vehicle having admission and exhaust valves controlled by cams on an axially movable cam shaft, and exhaust cam on said shaft adapted in one position of said shaft to actuate said exhaust valve and to be out of engagement with said exhaust valve when said shaft is axially moved, an admission cam on said shaft of such width as to actuate the admission valve in either position of said shaft, one half of said cam being so shaped as, when said shaft is axially moved, to open the admission valve when the piston is near the end of its instroke and during the outstroke of the piston and to close the admission valve when the piston is near the end of its outstroke and during its instroke and means for admitting air to the engine cylinder through said admission valve.

In testimony whereof I affix my signature in presence of two witnesses.

ERNST MOEWES.

Witnesses:
WOLDEMAR HAUPT,
HENRY HASPER.